(12) United States Patent
Yoneda

(10) Patent No.: US 11,082,197 B2
(45) Date of Patent: Aug. 3, 2021

(54) CONTROL SYSTEM AND CONTROL DEVICE

(71) Applicant: OMRON Corporation, Kyoto (JP)

(72) Inventor: Mitsuhiro Yoneda, Tenri (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/639,557

(22) PCT Filed: Aug. 23, 2018

(86) PCT No.: PCT/JP2018/031068
§ 371 (c)(1),
(2) Date: Feb. 14, 2020

(87) PCT Pub. No.: WO2019/058861
PCT Pub. Date: Mar. 28, 2019

(65) Prior Publication Data
US 2021/0135836 A1    May 6, 2021

(30) Foreign Application Priority Data

Sep. 25, 2017  (JP) .............................. JP2017-183680

(51) Int. Cl.
*H04L 12/28*    (2006.01)
*H04L 7/00*    (2006.01)
(Continued)

(52) U.S. Cl.
CPC ............ *H04L 7/0008* (2013.01); *G05B 19/05* (2013.01); *H04L 12/28* (2013.01); *H04L 45/24* (2013.01)

(58) Field of Classification Search
CPC ... H04L 7/0008; H04L 12/28; H04L 12/2807; H04L 12/2814; H04L 12/283;
(Continued)

(56) References Cited

U.S. PATENT DOCUMENTS

| | | | |
|---|---|---|---|
| 2013/0173950 A1* | 7/2013 | Banerjea .................... | G06F 1/04 713/503 |
| 2016/0080533 A1* | 3/2016 | Jeon ....................... | H04L 12/403 370/402 |
| 2016/0292110 A1* | 10/2016 | Niwa .................... | G05B 19/054 |

FOREIGN PATENT DOCUMENTS

| | | |
|---|---|---|
| CN | 101316160 | 12/2008 |
| CN | 101405676 | 4/2009 |

(Continued)

OTHER PUBLICATIONS

"International Search Report (Form PCT/ISA/210) of PCT/JP2018/031068," dated Nov. 20, 2018, with English translation thereof, pp. 1-2.

(Continued)

*Primary Examiner* — Siu M Lee
(74) *Attorney, Agent, or Firm* — JCIPRNET

(57) ABSTRACT

Each of a plurality of control devices includes: an upper communication part which transmits/receives first data to/from other control devices via a first network; and a lower communication part which transmits/receives second data to/from one or more equipment via a second network. The upper communication part has a first timer time-synchronized with each other among the plurality of control devices. The lower communication part determines, based on the time of the first timer, a timing to start processing for transmitting the second data to the one or more equipment.

13 Claims, 9 Drawing Sheets

(51) Int. Cl.
 *G05B 19/05* (2006.01)
 *H04L 12/707* (2013.01)
(58) Field of Classification Search
 CPC ............. H04L 12/2832; H04L 12/2834; H04L 12/2836; H04L 45/24; G05B 19/05
 See application file for complete search history.

(56) References Cited

FOREIGN PATENT DOCUMENTS

| | | |
|---|---|---|
| JP | 2002351513 | 12/2002 |
| JP | 2015115864 | 6/2015 |
| JP | 2015118505 | 6/2015 |
| JP | 2016184811 | 10/2016 |
| WO | 2016152237 | 9/2016 |

OTHER PUBLICATIONS

"Written Opinion of the International Searching Authority (Form PCT/ISA/237) of PCT/JP2018/031068," dated Nov. 20, 2018, with English translation thereof, pp. 1-6.
"Office Action of China Counterpart Application", dated Apr. 30, 2021, with English translation thereof, pp. 1-45.

* cited by examiner

CONTROL SYSTEM AND CONTROL DEVICE

CROSS-REFERENCE TO RELATED APPLICATION

This application is a 371 application of the International PCT application serial no. PCT/JP2018/031068, filed on Aug. 23, 2018, which claims the priority benefit of Japan Patent Application No. 2017-183680, filed on Sep. 25, 2017. The entirety of each of the abovementioned patent applications is hereby incorporated by reference herein and made a part of this specification.

BACKGROUND OF THE INVENTION

Technical Field

The present invention relates to a control system in which a plurality of control devices is connected to a network, and a control device constituting the control system.

Related Art

A FA (Factory Automation) technology using a control device such as a PLC (Programmable Controller) or the like is widely used in various production sites. This control device transmits/receives data to/from one or more equipment via a bus or a network.

Along with high functionality of the control system, a configuration in which a plurality of control devices that executes control processing independent of each other is connected via a network is also being implemented. For example, in Japanese Patent Application Laid-Open No. 2015-118505 (patent literature 1), a control system is disclosed in which a plurality of control devices is connected to a controller level network. A plurality of input/output devices is connected to each of the plurality of control devices via a device level network. Each control device transmits input values acquired from the plurality of input/output devices to a server via the controller level network.

LITERATURE OF RELATED ART

Patent Literature

SUMMARY

Problems to be Solved

However, since the plurality of control devices executes the control processing independent of each other, timings for collecting data (input data) collected or generated in equipment, or timings for transmitting data (output data) such as a command for equipment to the target equipment cannot be synchronized with each other between one control device and other control devices.

In addition, in order to operate the equipment connected to the one control device and the equipment connected to the other control devices in a coordinated manner, it is necessary to exchange information of each equipment between the control devices, but the timings at which input data is collected or the timings at which output data is output cannot be synchronized with each other, and thus synchronization of the control timings among the plurality of equipment becomes difficult.

As described above, since cooperative control of the plurality of equipment connected to the control devices different from each other cannot be performed, as a result, there is concern that the plurality of equipment cannot be made to operate in a coordinated manner.

An objective of the present invention is to provide a new configuration for implementing, in a control system in which a plurality of control devices is connected to a network, cooperative control of a plurality of equipment connected to the control devices different from each other.

In an example of the disclosure, a control system is provided which includes a plurality of control devices connected to a first network and one or more equipment connected to each of the plurality of control devices via a second network lower than the first network. Each of the plurality of control devices includes an upper communication part which transmits/receives first data to/from other control devices via the first network, and a lower communication part which transmits/receives second data to/from the one or more equipment via the second network. The upper communication part has a first timer time-synchronized with each other among the plurality of control devices. The lower communication part determines, based on the time of the first timer, a timing to start processing for transmitting the second data to the one or more equipment.

According to the control system of the disclosure, each of the plurality of control devices connected to the first network has a timer (first timer) time-synchronized with other control devices, and thus it is possible to determine the timing for transmitting/receiving data to/from one or more field equipment via the lower second network with reference to the time of this timer. Thereby, the timings for collecting input data or the timings for transmitting output data can be synchronized with each other among the plurality of control devices. In addition, since the plurality of control devices are time-synchronized with each other, the timings for exchanging data of the respective equipment can be synchronized with each other. As a result, cooperative control of the plurality of equipment connected to the control devices different form each other can be performed.

Thereby, the control timings can be synchronized among the plurality of equipment connected to the control devices different from each other, and thus processing waiting is not required among the plurality of equipment, and the processing time can be shortened. In addition, since the operations of the plurality of equipment are synchronized with each other, the operation timings can be matched, and the processing precision can be improved as a result.

Preferably, the upper communication part determines a timing to start processing for transmitting the first data, based on a maximum value of the time required for transmission/reception of the second data by the lower communication part in each of the plurality of control devices with reference to the timing to start processing for transmitting the second data. Accordingly, the timings to start the processing for transmitting the first data can be synchronized with each other among the plurality of control devices.

Preferably, each of the plurality of control devices executes a user program after executing the processing for transmitting the second data and the processing for transmitting the first data at a predetermined cycle.

Accordingly, each of the plurality of control devices can execute the user program based on the first and second data time-synchronized with other control devices. Besides, in the specification, the "user program" includes a program that can be arbitrarily created by the user. The "user program"

may include a sequence program for implementing sequence control, a motion program for implementing motion control, and an application program.

Preferably, the lower communication part has a second timer time-synchronized with the one or more equipment. Each of the plurality of control devices further includes a synchronization part for time-synchronization between the first timer and the second timer. Accordingly, among the plurality of control devices, the one or more equipment connected respectively can be time-synchronized with each other.

Preferably, the upper communication part transmits/receives the first data according to a first protocol. The lower communication part transmits/receives the second data according to a second protocol different from the first protocol. The synchronization part corrects the time of the second timer with reference to the first timer.

Accordingly, even when data is transmitted/received according to different protocols by the upper communication part and the lower communication part, the upper communication part and the lower communication part can also be time-synchronized.

Preferably, the lower communication part updates the second data at a predetermined cycle. The upper communication part divides the first data into data sizes corresponding to the time available at every cycle, and assigns each divided data to a plurality of cycles.

Accordingly, it is possible to transmit the first data while guaranteeing that the second data is updated at every predetermined cycle.

In an example of the disclosure, control devices connected to a first network and connected to one or more equipment via a second network lower than the first network are provided. The control device includes an upper communication part which transmits/receives first data to/from other control devices via the first network, and a lower communication part which transmits/receives second data to/from one or more slave equipment via the second network. The upper communication part has a first timer time-synchronized with each other among other control devices. The lower communication part determines, based on the time of the first timer, a timing to start processing for transmitting the second data to the one or more equipment.

According to an example of the disclosure, in a control system in which a plurality of control devices is connected to a network, cooperative control of a plurality of equipment connected to the control devices different from each other can be implemented.

DESCRIPTION OF THE EMBODIMENTS

§ 1 Application Example

Figure 2:
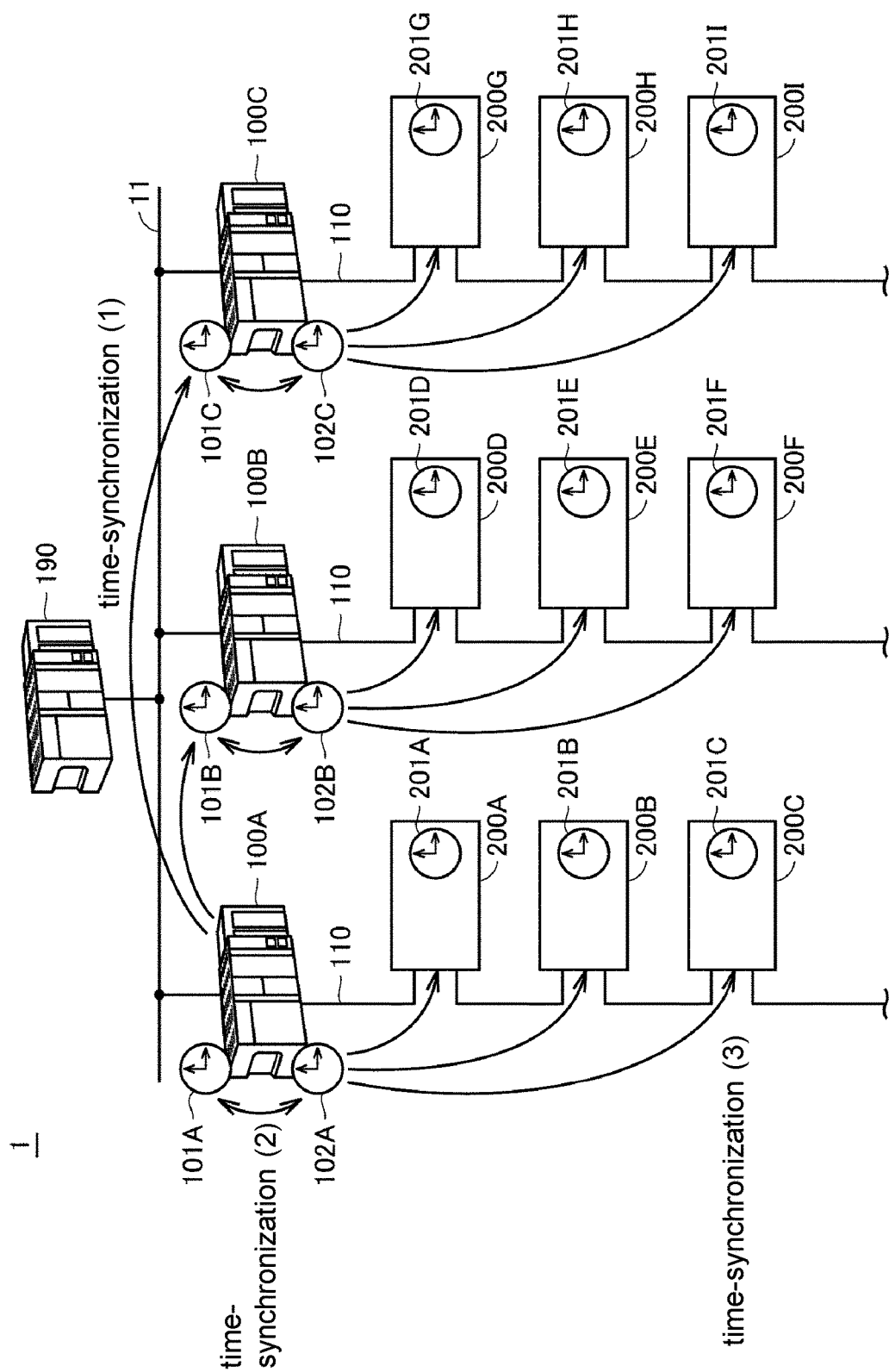
FIG. 2 is a schematic diagram showing a network configuration example of the control system of the embodiment.

First, FIG. 2 is used to describe an example of a scene to which the present invention is applied. FIG. 2 is a diagram schematically showing an example of main components of a control system 1 of the embodiment.

Referring to FIG. 2, in the control system 1 of the embodiment, a plurality of control devices 100A-100C is connected to a network 11 of controller level. One or more field equipment 200 is connected to each of the plurality of control devices 100A-100C via a field network 110. The network 11 corresponds to one example of a "first network" of the present invention, and the field network 110 corresponds to one example of a "second network" of the present invention.

Each of the plurality of control devices 100A-100C transmits/receives data to/from the one or more field equipment 200 via the field network 110. Each of the plurality of control devices 100A-100C further transmits/receives data to/from other control devices via the network 11.

The plurality of control devices 100A-100C respectively has timers 101A-101C (first timers) that are time-synchronized with other control devices. Each of the plurality of control devices 100A-100C further has a timer 102 (second timer) time-synchronized with the one or more field equipment 200. In each of the plurality of control devices 100A-100C, the timer 102 (second timer) is synchronized with the timer 101 (first timer). Thereby, each of the plurality of control devices 100A-100C can substantially determine, based on the time of the timer 101 synchronized with each other among the plurality of control devices, a timing to start processing for transmitting data to the field equipment 200 (corresponding to a timing T1 in FIG. 6). As a result, among the plurality of control devices 100A-100C, the timings for collecting input data or the timings for transmitting output data can be synchronized with each other. In addition, since the plurality of control devices 100A-100C is time-synchronized with each other, the timings for exchanging data of respective equipment can be synchronized with each other. As a result, cooperative control of the plurality of field equipment 200 connected to the control devices different from each other can be implemented.

By employing this configuration, for example, at a production site, the control timings can be synchronized among the plurality of equipment connected to the control devices different from each other, and thus processing waiting is not required among the plurality of equipment, and the processing time can be shortened. In addition, since the operations of the plurality of equipment are synchronized with each other, the operation timings can be matched, and the processing precision (assembly precision, machining precision, and the like) can be improved as a result.

§ 2 Configuration Example

Embodiments of the present invention are described in detail with reference to the drawings. Besides, the same or corresponding parts in the drawings are denoted by the same reference signs, and the description thereof is not repeated.

In the following description, as a typical example of "control device", a PLC (programmable controller) is described as a specific example, but the control device is not limited to the name of PLC, and the technical idea disclosed in the specification can be applied to any control device. In addition, the entire system including the PLC (control device) is also referred to as "control system" below.

<A. Overall Configuration of Control System>

Figure 1:
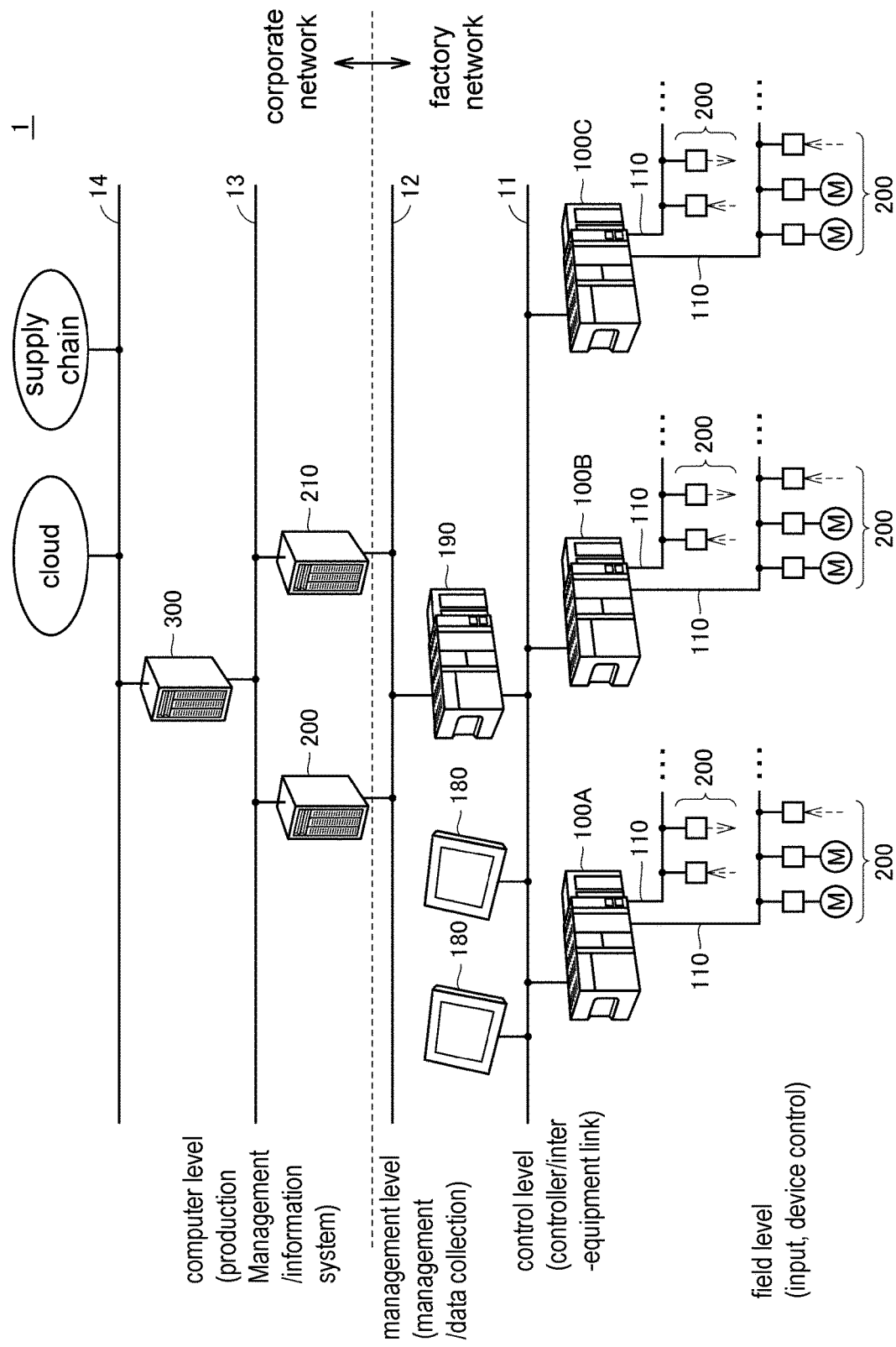
FIG. 1 is a schematic diagram showing an overall configuration example of a control system of the embodiment.

First, an overall configuration of the control system of the embodiment is described. FIG. 1 is a schematic diagram showing an example of the overall configuration of the control system 1 of the embodiment.

Referring to FIG. 1, in the control system 1, networks are connected at a plurality of levels, and different functions are assigned to the networks of the respective levels. Specifically, four levels of networks 11-14 are arranged.

The network 11 is a network of control level, the plurality of control devices 100A-100C (hereinafter also referred to as "control device 100") which is machine control equipment, and device/line management equipment, that is, a device/line management device 190 and a display device 180 which provides a SCADA (Supervisory Control And Data Acquisition) function are connected to the network 11, and a link capable of transmitting data among the devices is formed. The network 2 establishes a data link between a controller (the control device 100) and management equipment (the device/line management device 190 and the display device 180). The network 11 mainly provides transmission of information related to the control system as a main function.

Various field equipment such as a sensor and an actuator is connected to the control device 100. The field equipment may be directly connected via an input/output unit attached to the control device 100, or may be connected via a field network. In the configuration example shown in FIG. 1, in the control device 100, one or more field networks 110 are configured, and one or more field equipment 200 is connected to each field network 110. Each of the one or more field equipment 200 includes an actuator that gives some physical action on a manufacturing device, a production line or the like (hereinafter also collectively referred to as "field"), an input/output device that exchange information with the field, and the like. Accordingly, in addition to the four levels of networks 11-14, a network of field level is further added to the control system 1 shown in FIG. 1.

Data is exchanged between the control device 100 and the field equipment 200 via the field network 110, and the exchanged data is updated at a very short cycle of several hundreds of microseconds to tens of milliseconds. Besides, this update processing of the exchanged data is also referred to as input/output refresh processing.

The network 12 is a network of management level, the device/line management device 190 is connected to a production management device 300 and a database device 310, and a link capable of transmitting data among the devices is formed. The network 12 provides management information exchange and device/line information transmission as main functions.

The network 13 is a network of computer level, the production management device 300 and the database device 310 are connected to a production management device 350 for managing production plans or the like, and a link capable of transmitting data among the devices is formed. The network 13 provides production management and transmission of information system data as main functions.

The network 14 is an external network such as the Internet or the like, and the production management device 350 is connected to a cloud, a supply chain or the like.

In the control system 1 shown in FIG. 1, the network 12 and lower levels are also referred to as "factory network", and provide control system communication for exchanging data for actually controlling the equipment (hereinafter also collectively referred to as "control system data"). On the other hand, the levels equal to or higher than the network 13 are also referred to as "corporate network", and provide information system communication for exchanging data for monitoring, managing, and controlling production activities or the like in production lines/factories (hereinafter also collectively referred to as "information system data").

In the networks 11-14 and the field network 110, protocols and frameworks corresponding to differences in the required characteristics are employed. For example, as a protocol of the networks 11 and 12 belonging to the factory network, EtherNet/IP (registered trademark) which is an industrial open network in which a control protocol is mounted on general-purpose Ethernet (registered trademark) may be used. In addition, as a protocol of the field network 110, EtherCAT (registered trademark) which is an example of machine control network may be employed. Besides, the protocol (first protocol) of the network 11 and the protocol (second protocol) of the field network 110 may be the same or different.

By employing the network technology suitable for the machine control, a real-time performance with guaranteed time required for transmission among the equipment can be provided. However, the amount of data that can be transmitted at one communication cycle is limited.

On the other hand, the general-purpose Ethernet or the like is used as the protocols of the networks 13 and 14 belonging to the corporate network to ensure diversity of connection destinations. By employing the general-purpose Ethernet, the amount of data that can be transmitted is not limited although the real-time performance cannot be achieved.

<B. Overview>

In the factory network shown in FIG. 1, each of the plurality of control devices 100A-100C connected to the network 11 transmits data to/from the one or more equipment 200 connected via the field network 110. Specifically, the control device 100 executes processing (input processing) for collecting data (input data) collected or generated in the field equipment 200, processing (computation processing) for generating data (input data) such as a command to the field equipment 200 or the like, processing (output processing) for transmitting the generated output data to the target field equipment 200, and the like.

In the field network 110, the arrival time of data needs to be guaranteed. Therefore, the control device 100 has timers that define the timings of data transmission and that are time-synchronized with each other among subjects in which data is transmitted/received (that is, the one or more field equipment 200).

However, when time-synchronization is not achieved among the plurality of control devices 100, for example, the field equipment 200 connected to one control device 100 and the field equipment 200 connected to other control devices 100 cannot be time-synchronized. As a result, a case may occur in which the timings of the input/output refresh processing do not match, and thus it becomes difficult to operate the plurality of field equipment 200 connected to the control devices 100 different from each other in a coordinate manner.

Therefore, in the control system 1 of the embodiment, the timer possessed by each of the plurality of control devices 100 is time-synchronized with one another. Thereby, the cooperative control of the plurality of field equipment 200 connected to the control devices 100 different from each other is implemented.

Hereinafter, a time-synchronization function provided by the control system 1 of the embodiment is described.

<C. Network Configuration Example>

Next, a network configuration example of the control system 1 of the embodiment is described. FIG. 2 is a schematic diagram showing the network configuration example of the control system 1 of the embodiment.

The control system 1 shown in FIG. 2 includes the plurality of control devices 100A-100C and a plurality of field equipment 200A-200I. The control system 1 employs, as an example, a network in which at least some control devices are connected in a daisy chain. Each of the control devices 100A-100C functions as a master that manages data transmission in the field network 110. The field equipment 200A-200I functions as slaves that perform data transmission according to commands from the corresponding masters.

The control devices 100A-100C are connected to the network 11 of control level (upper network). For example, a line management device 190 is connected to the network 11.

The field equipment 200A-200C is sequentially connected in a daisy chain to the field network 110 connected to the control device 100A, the field equipment 200D-200F is sequentially connected in a daisy chain to the field network 110 connected to the control device 100B, and the field equipment 200G-200I is sequentially connected in a daisy chain to the field network 110 connected to the control device 100C.

In the field network 110, both the control device 100 and the one or more field equipment 200 can be regarded as a communication device having a data transmission function. In the example shown in FIG. 2, each of the control device 100 and the one or more field equipment 200 has a function for transmitting, when receiving data transmitted on the network from a communication device connected adjacently, the data to another communication device connected adjacently as necessary. Besides, when the received data is addressed to the device itself, the received data is not transmitted to another communication device, and the data is processed by the device itself that has received the data.

In the control system 1 of the embodiment, transmission/reception timings are time-synchronized among a plurality of communication devices constituting the field network 110, that is, among the control device 100 and the one or more field equipment 200 (corresponding to time-synchronization (3) in the drawing). Specifically, each of the control device 100 and the one or more field equipment 200 has timers (or counters that are incremented or decremented synchronously) time-synchronized with each other, and determines the timing of transmission or reception of data according to the time-synchronized timers or counters.

In the example shown in FIG. 2, the control device 100A has a timer 102A, and the field equipment 200A-200C respectively has timers 201A-201C. The timer 102A of the control device 100A functions as a master, and the timers of the field equipment 200A-200C synchronize timing with reference to this master.

The control device 100B has a timer 102B, and the field equipment 200D-200F respectively has timers 201D-201F. The timer 102B of the control device 100B functions as a master, and the timers of the field equipment 200D-200F synchronize timing with reference to this master.

The control device 100C has a timer 102C, and the field equipment 200G-200I respectively has timers 201G-201I. The timer 102C of the control device 100C functions as a master, and the timers of the field equipment 200G-200I synchronize timing with reference to this master.

That is, each of the control devices 100A-100C functions as a master for managing data transmission in the field network 110, and the field equipment 200 connected to each control device 100 functions as a slave that performs data transmission according to the command from the master. By synchronizing the timers between the master and the slave, the transmission timings of the data between the control device 100 and the field equipment 200 constituting the field network 110 can be made to match with each other.

In the example shown in FIG. 2, the control device 100A further has a timer 101A time-synchronized with the timer 102A. The control device 100B further has a timer 101B time-synchronized with the timer 102B. The control device 100C further has a timer 101C time-synchronized with the timer 102C (corresponding to time-synchronization (2) in the drawing). In the control system 1, any one of the timers 101A-101C is made to function as a master of the entire control system 1. Hereinafter, the master of the entire system is also referred to as a "grand master clock".

As an example, in FIG. 2, the timer 101A of the control device 100A is set as the grand master clock, and the timers of the control devices 100B and 100C are time-synchronized with the grand master clock. Thereby, time-synchronization can be achieved among the plurality of control devices 100A-100B (corresponding to the time-synchronization (1) in the drawing).

As described above, the plurality of control devices 100A-100C respectively has timers (first timers) time-synchronized with each other among the plurality of control devices 100A-100C, and timers (second timers) time-synchronized with the one or more field equipment 200 connected to the field network 110, and the first timers and the first timers are time-synchronized with each other. As a result, the second timer (timer 102A) time-synchronized among the control device 100A and the field equipment 200A-200C, the second time (timer 102B) time-synchronized among the control device 100B and the field equipment 200D-200F, and the second timer (timer 102C) time-synchronized among the control device 100C and the field equipment 200G-200I are time-synchronized with each other.

Besides, in FIG. 2, a configuration example in which the timer of any one of the control devices 100 is set as a grand master clock is described, but the timer of the external device may also be set as a grand master clock.

<D. Data Communication Processing>

Figure 3:
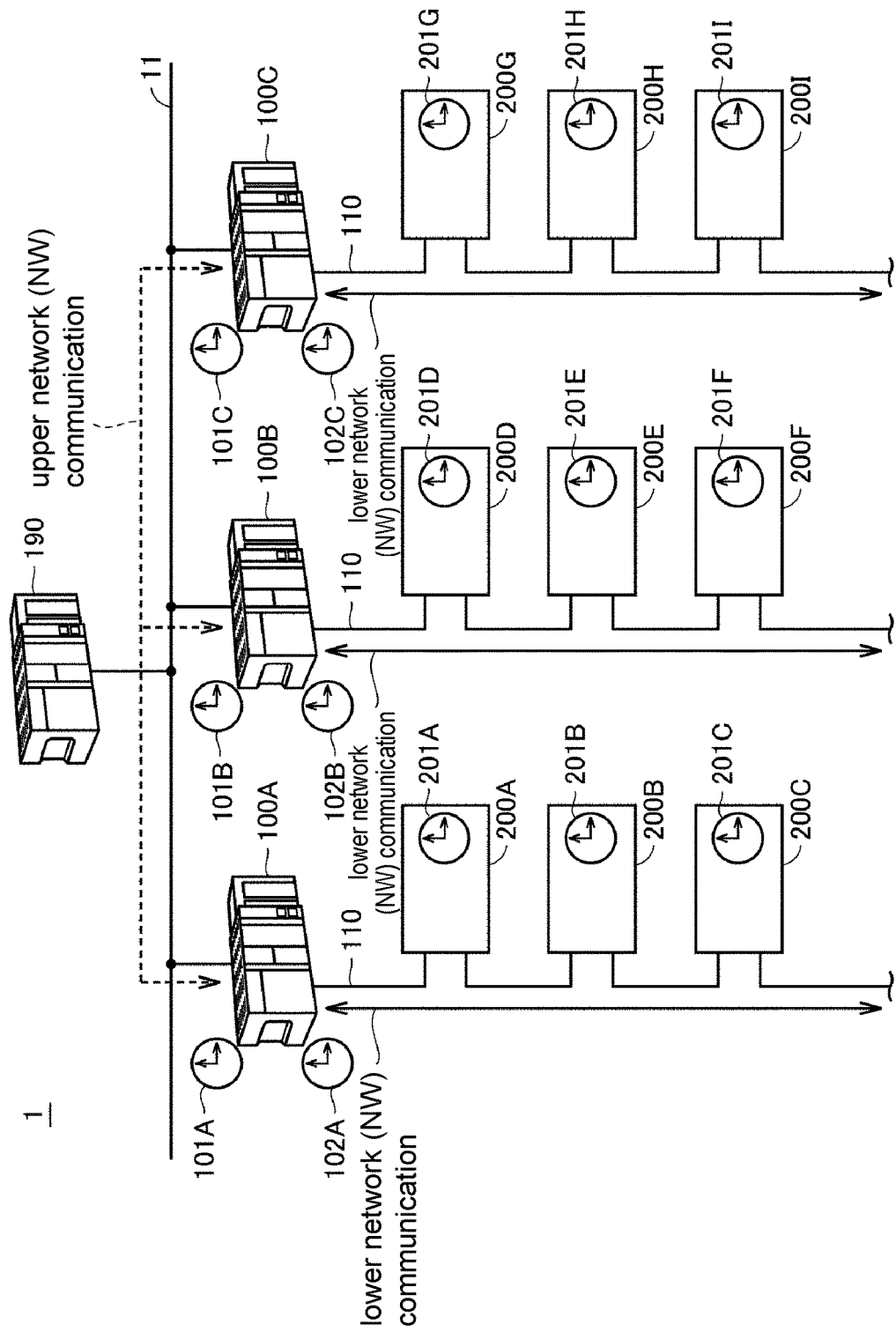
FIG. 3 is a schematic diagram showing data communication processing of the control system of the embodiment.

FIG. 3 is a schematic diagram showing data communication processing of the control system 1 of the embodiment. Referring to FIG. 3, data is exchanged according to a predetermined system cycle between the control device 100A connected to the field network 110 and the plurality of field equipment 200A-200C.

Data is also exchanged between the control device 100B and the plurality of field equipment 200D-200F and between the control device 100C and the plurality of field equipment 200G-200I according to the system cycle. Control operations of the control device 100 and the field equipment are implemented by the exchange of data. In the following description, the communication on the field network 110 is also referred to as "lower network (NW) communication".

Among the control devices 100A-100C connected to the upper network 11, data collected from the field equipment 200 by each control device performing the input processing, data generated by each control device performing the computation processing, and the like are exchanged according to a predetermined system cycle. By the data exchange, the field equipment 200 connected to the control device 100A, the field equipment 200 connected to the control device 100B, and the field equipment 200 connected to the control device 100C can be made to operate in a coordinated manner. In the following description, the communication on the network 11 is also referred to as "upper network (NW) communication".

In the control system 1 of the embodiment, the timing to start data transmission in the lower network communication is determined based on the times of the timers (first timers) time-synchronized with each other among the plurality of control devices 100A-100C. Thereby, among the plurality of control devices 100A-100C, the timings for exchanging data with the field equipment 200 can be made to match with each other, and thus the control timings of the field equipment 200 can be synchronized as a result.

<E. Hardware Configuration Example of Control Device>

Next, a hardware configuration of the control device 100 of the embodiment is described.

Figure 4:
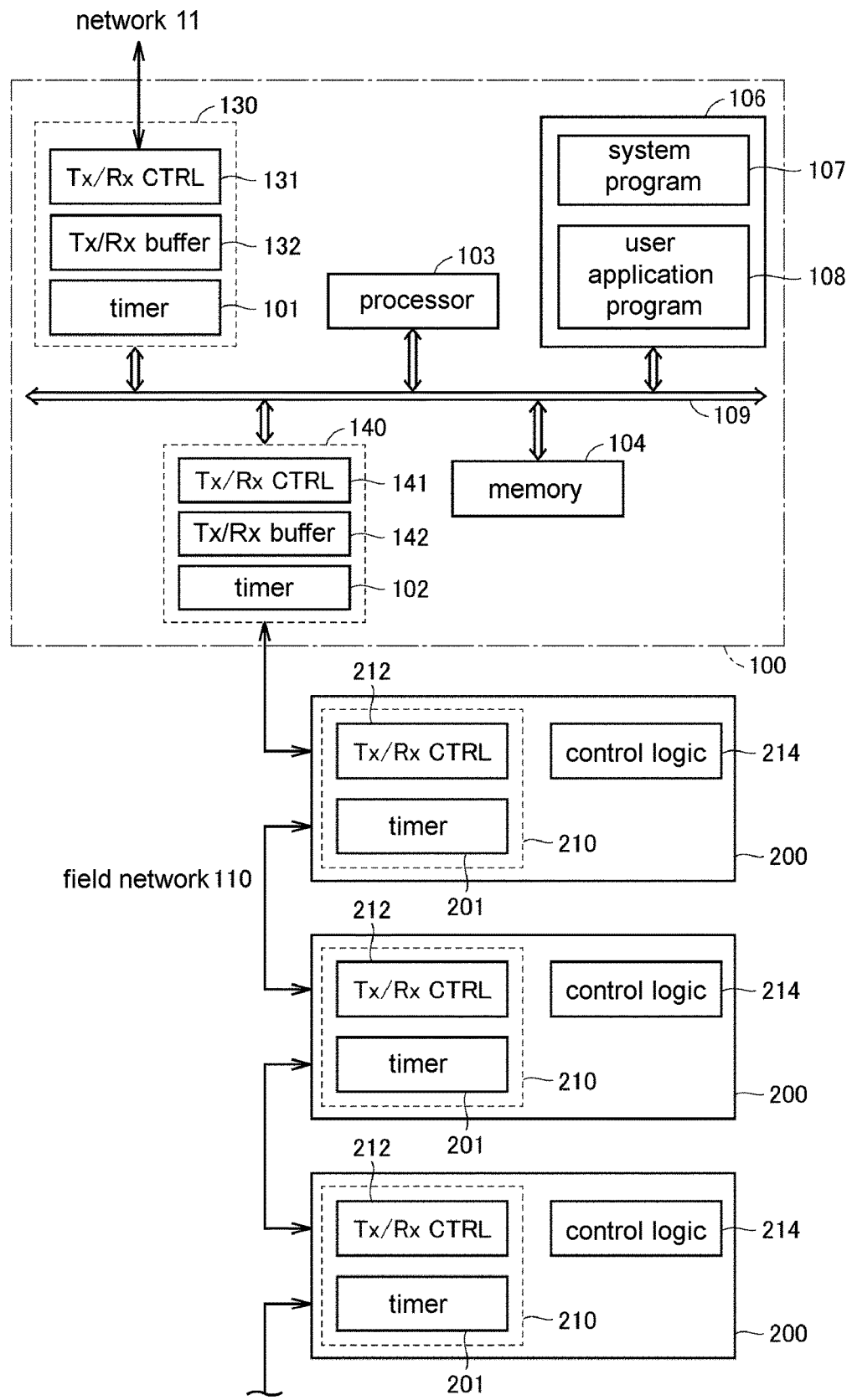
FIG. 4 is a block diagram showing a hardware configuration example of the control device of the embodiment.

FIG. 4 is a block diagram showing a hardware configuration example of the control device 100 of the embodiment. The control device 100 may be typically configured with a PLC (programmable controller) as a base.

Referring to FIG. 4, the control device 100 includes a processor 103, a memory 104, a storage 106, a network controller 130, and a field network controller 140 as main components.

The processor 103 reads out and executes a system program 107 and a user application program 108 stored in the storage 106, and thereby implementing various processing including the processing described below. The memory 104 consists of a volatile storage device such as a DRAM (Dynamic Random Access Memory), a SRAM (Static Random Access Memory) or the like. The storage 106 stores a user application program 108 designed corresponding to a control target or the like in addition to the system program 107 for controlling each part of the control device 100.

The network controller 130 provides an interface for the control device 100 to exchange data with other devices via the network 11. The network controller 130 includes a transmission/reception controller 131, a transmission/reception buffer 132, and a timer 101 as main components.

The transmission/reception controller 131 performs processing related to the generation and reception of packets transmitted on the network 11 at a fixed cycle. Specifically, the transmission/reception controller 131 writes data stored in the packets received from the network 11 into the transmission/reception buffer 132. The transmission/reception controller 131 sequentially reads out the received packets written into the transmission/reception buffer 132, and outputs only the data necessary for the processing in the control device 100 among the readout data to the processor 103. The transmission/reception controller 131 sequentially writes data or packets to be transmitted to another device into the transmission/reception buffer 132 according to a command from the processor 103. The data stored in the transmission/reception buffer 132 is sequentially sent out corresponding to a cycle at which the packets are transmitted on the network controller 130.

The timer 101 generates a pulse serving as a timing reference for indicating data transmission from the transmission/reception controller 131 or the like. As the timer 101, a real-time clock or a free-run counter that counts up (increments) at a predetermined cycle can be used. The current time can be calculated by handling the count value output by the free-run counter as an elapsed time from a certain point of time, and the free-run counter can thereby function as a timer.

The field network controller 140 provides an interface for the control device 100 to exchange data with the field equipment 200 via the field network 110. The field network controller 140 includes a transmission/reception controller 141, a transmission/reception buffer 142, and a timer 102 as main components. Since the functions of these components are the same as the corresponding components of the network controller 130, the detailed description is not repeated.

The field equipment 200 implements control of various machines or facilities performed by the control system 1. Typically, each of the field equipment 200 is responsible for collecting field information from the machines, facilities or the like being the control target, outputting command signals to the machines or facilities being the control target, or the like. The field equipment 200 includes a field network controller 210 and a control logic 214 for managing data transmission on the field network 110 as main components.

The field network controller 210 provides an interface for the field equipment 200 to exchange data with the control device 100 via the field network 110.

The field network controller 210 includes a transmission/reception controller 212 and a timer 201 as main components. The transmission/reception controller 212 performs data write-in and data read-out for a communication frame transmitted on the field network 110. The timer 201 generates a clock serving as a timing reference of command output to the transmission/reception controller 212, processing execution in the field equipment 200, or the like. A real-time clock or a free-run counter is used as the timer 201.

The network controller 130 corresponds to an example of an "upper communication part" in the present invention. As shown in FIG. 2, the timer 101 of the network controller 130 is time-synchronized with the timers 101 of the network controllers 130 of other control devices 100. That is, the timer 101 corresponds to an example of the "first timer" in the present invention.

The field network controller 140 corresponds to an example of a "lower communication part" in the present invention. As shown in FIG. 2, the timer 102 of the field network controller 140 is time-synchronized with the timer 201 of the field equipment 200, that is, the timer 102 corresponds to an example of the "second timer" in the present invention.

<F. Software Configuration>

Figure 5:
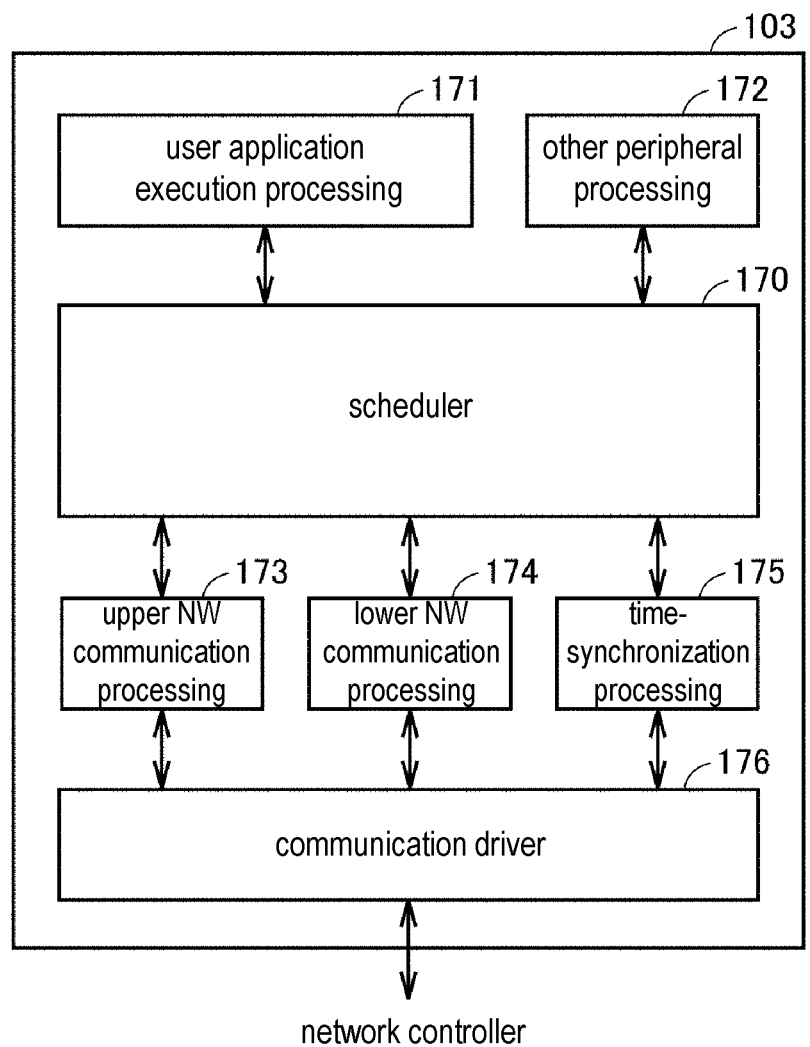
FIG. 5 is a schematic diagram showing an example of a software configuration of the control device for implementing control processing of the embodiment.

Next, an example of the software configuration for implementing the control processing of the embodiment is described. FIG. 5 is a schematic diagram showing an example of the software configuration of the control device 100 for implementing the control processing of the embodiment.

Referring to FIG. 5, a scheduler 170 is executed in the processor 103 of the control device 100. The scheduler 170 determines an execution order, an execution interruption or the like of a plurality of processing according to a predetermined system cycle. More specifically, the scheduler 170 assigns processing resources (processor time, memory, and the like) to user application execution processing 171, peripheral processing 172 including various processing, upper network communication processing 173, lower network communication processing 174, and time-synchronization processing 175 according to a predetermined priority, system cycle and the like.

The user application execution processing 171 includes processing related to execution of the user application program 108 (see FIG. 4).

The upper network communication processing 173 includes data processing related to the upper network communication, for example, data creation, encoding, decoding, extraction, machining editing, and the like. Similarly, the lower network communication process 174 includes data processing related to the lower network communication.

The time-synchronization processing 175 includes time-synchronization processing. For example, when the timer 101 of the own control device 100 is set as the grand master clock, the time-synchronization processing 175 includes processing for adjusting the timers of other control devices 100 and the field equipment 200 with reference to the timer 101 so that other control devices 100 and the field equipment 200 are time-synchronized. Alternatively, when the timer 101 of another control device 100 is set as the grand master clock, the time-synchronization processing 175 includes processing for adjusting the own timer 101 and the timer 201 of the field equipment 200 with reference to the timer 101 of the above another control device 100.

Furthermore, a communication driver 176 is mounted on the processor 103 of the control device 100, and the communication driver 176 controls a network controller (see FIG. 4) and the like.

<G. Scheduling of Control Processing>

Next, scheduling of the control processing in the control device 100 of the embodiment is described.

Figure 6:
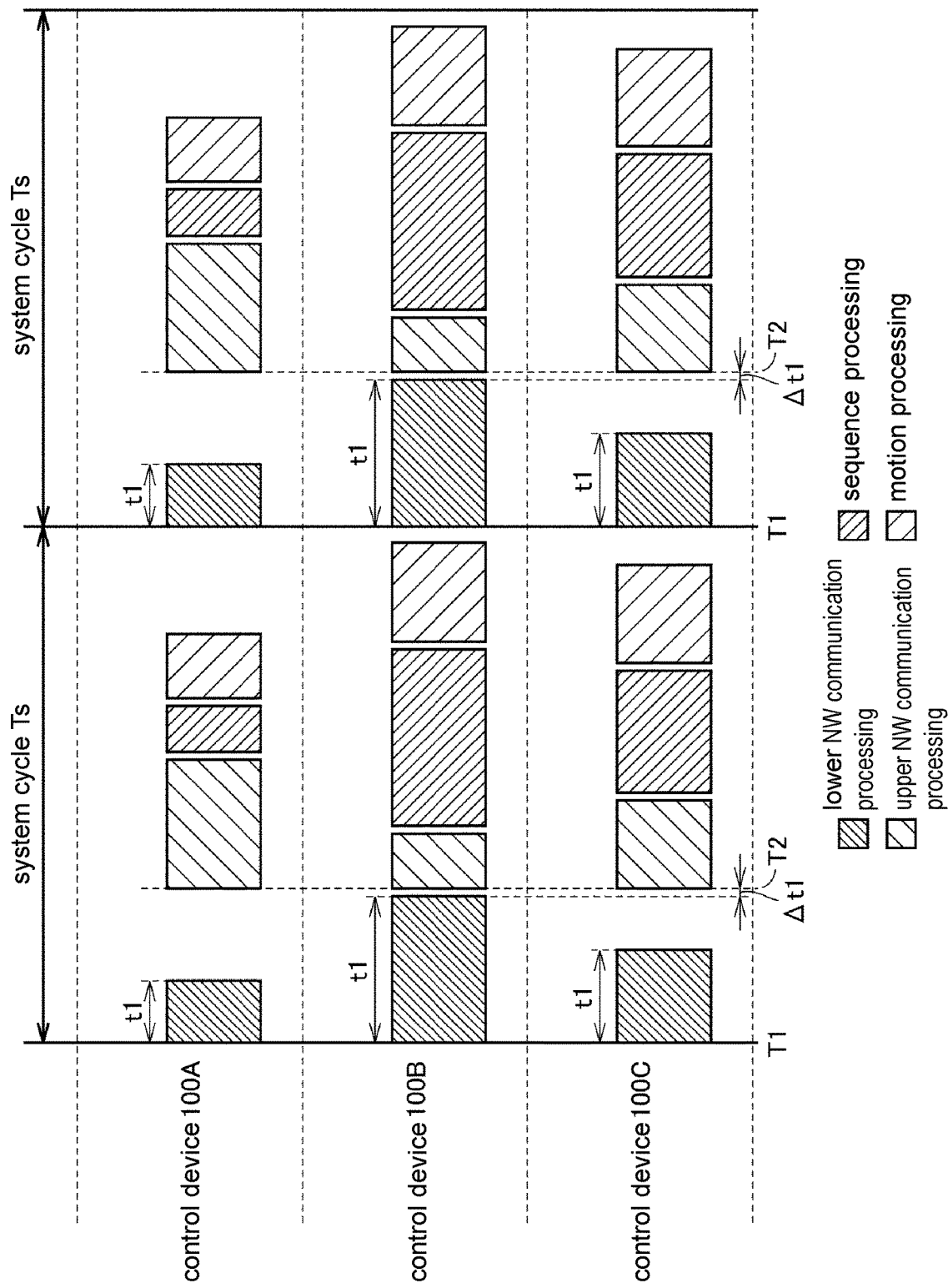
FIG. 6 is a schematic diagram for illustrating scheduling of the control processing in the control device of the embodiment.

FIG. 6 is a schematic diagram for illustrating the scheduling of the control processing in the control device 100 of the embodiment. In FIG. 6, the execution timing of the control processing in the plurality of control devices 100A-100C connected to the network 11 is shown.

Referring to FIG. 6, in each of the control devices 100A-100C, the upper network communication processing, the lower network communication processing, sequence processing, and motion processing are executed according to a predetermined system cycle Ts.

As shown in FIG. 3, the upper network communication processing is processing for exchanging data via the upper network 11 among the plurality of control devices 100A-100C. In the upper network communication processing, input/output refresh processing for updating input data and output data is executed. In the input/output refresh processing, the input data is collected from other control devices 100, and the output data calculated at the immediately preceding system cycle Ts is given to other control devices 100.

As shown in FIG. 3, the lower network communication processing is processing for exchanging data between the control device 100 and the field equipment 200 via the field network 110. In the lower network communication processing, input/output refresh processing for updating input data and output data is executed. In the input/output refresh processing, the input data is collected from the field equipment 200, and the output data calculated by the motion processing at the immediately preceding system cycle Ts is given to the field equipment 200.

The sequence processing is basically processing for executing a program (sequence program) described by one or more logic circuits that calculate input values, output values, internal values, and the like. Besides, the sequence program may be a program representing an electric circuit.

The motion processing is processing for computing, for an actuator such as a servo motor, using numerical values such as position, velocity, acceleration, jerk, angle, angular velocity, angular acceleration, angular jerk, and the like as commands.

In the example of FIG. 6, in each of the control devices 100A-100C, first, the lower network communication processing is assigned in priority. Specifically, a processing time required for the lower network communication processing (hereinafter also referred to as "lower network communication processing time") t1 is assigned to the system cycle Ts. A processing time required for the upper network communication processing, a processing time required for the sequence processing, and a processing time required for the motion processing are sequentially assigned to the remaining time obtained by excluding the lower network communication processing time t1 from the system cycle Ts.

In the scheduling of the embodiment, the timings (corresponding to timings T1 in the drawing) to start the lower network communication processing are made to match with each other among the plurality of control devices 100A-100C. In the scheduling of the embodiment, furthermore, the timings (corresponding to timings T2 in the drawing) to start the upper network communication processing are made to match with each other among the plurality of control devices 100A-100C. Thereby, it is possible to make an acquisition timing of the input data and an output timing of the output data match with each other among the plurality of control devices 100A-100C.

Besides, since the upper network communication does not occur at every system cycle, in any one of the control devices 100A-100C, the sequence processing and the motion processing may be performed in the remaining time obtained by excluding the lower network communication processing time from the system cycle. In this case, the timings to start the upper network communication processing are matched among the remaining control devices excluding this control device.

Alternatively, by matching the timings to start the upper network communication processing among the plurality of control devices 100A-100C, in any one of the control devices, the remaining time obtained by excluding the upper network communication processing time is reduced, and the time required for executing the sequence processing and the motion processing within the system cycle may not be secured. In this case, in the control device, the data serving as a target of the upper network communication is divided into data sizes corresponding to the communication time available at every system cycle, and then each divided data is assigned to a plurality of system cycles.

Figure 7:
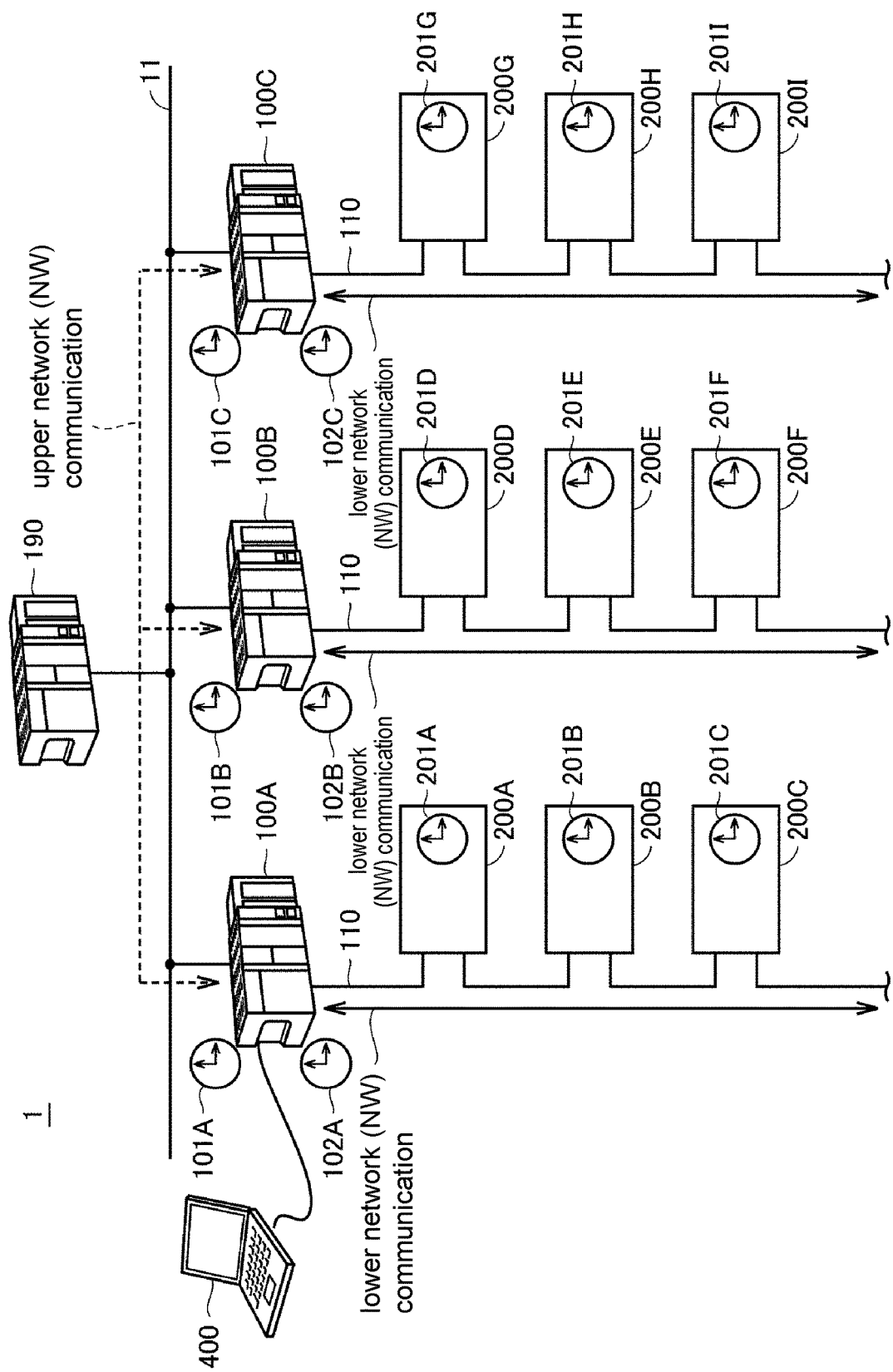
FIG. 7 is a schematic diagram for illustrating processing for determining a start timing of communication processing in the scheduling of the control processing shown in FIG. 6.
Figure 8:
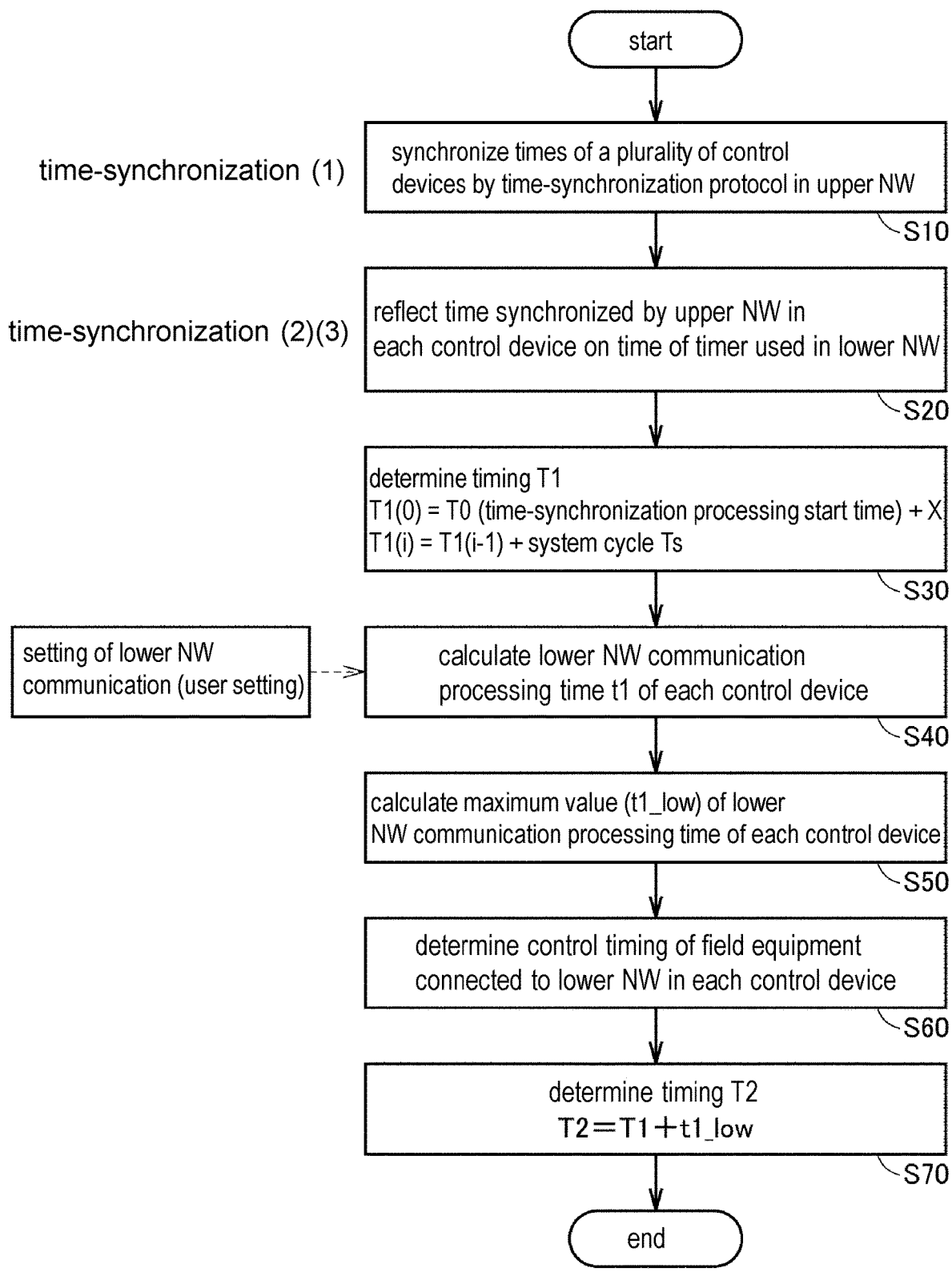
FIG. 8 is a flowchart for illustrating the processing for determining the start timing of the communication processing in the scheduling of the control processing shown in FIG. 6.

FIG. 8 is a flowchart for illustrating processing for determining a start timing of the communication processing in the scheduling of the control processing shown in FIG. 6. The processing shown in FIG. 8 is typically executed using a support device 400 (see FIG. 7).

As shown in FIG. 7, the support device 400 can be connected to the control device 100. The support device 400 is a device that supports preparations necessary for the control device 100 to control the control target. Specifically, the support device 400 provides a development environment (program creation and editing tool, parser, compiler, and the like) of a program executed by the control device 100, a setting environment for setting parameters (configurations) of the control device 100 and various devices connected to the control device 100, a function for outputting the generated user program to the control device 100, a function for correcting/changing the user program or the like executed on the control device 100 online, and the like. The support device 400 is configured by a PC (personal computer) and the like in which setting tools are installed.

Besides, in the control system 1 shown in FIG. 7, the control device 100 and the support device 400 are configured separately, but a configuration in which the functions of the support device 400 are loaded on the control device 100 may also be employed.

Referring to FIG. 8, first, the timers 101 of the network controller 130 are synchronized with each other among the plurality of control devices 100 by a time-synchronization protocol in the upper network 11 (step S10). The time-synchronization can be achieved by employing a high precision time-synchronization protocol such as IEEE (Institute of Electrical and Electronics Engineers) 158, IEEE802.1 AS or the like as the time-synchronization protocol.

In the example of FIG. 2, the timer 101 of any one (for example, the control device 100A) among the plurality of control devices 100A-100C is set as the grand master clock, and the timers 101 of other control devices (for example, the control devices 100B and 100C) are time-synchronized with this grand master clock. By the processing in step S10, as shown in FIG. 2, the timers 101 of the network controller 130 are time-synchronized with each other among the plurality of control devices 100A-100C (corresponding to time-synchronization (1) in FIG. 2).

Next, in each of the plurality of control devices 100, the timer 102 of the field network controller 140 is time-synchronized with the timers 101 of the field network controller 130 time-synchronized with the other control devices 100 (step S20).

In order to implement the time-synchronization among the plurality of timers in the control device 100, a synchronization function is installed in the timer 101 of the network controller 130, and a latch function is executed in the timer 102 of the field network controller 140. The synchronization function of the timer 101 is a function for adjusting the timer 102 with reference to the timer 101. The latch function of the timer 102 is a function for adjusting the timer 102 with reference to the timer 101. The synchronization function of the timer 101 notifies, when the timer 101 asserts a synchronization signal at a specified timing, the time when the synchronization signal is asserted. On detecting the synchronization signal from the timer 101, the latch function corrects the time of the timer 102 based on the difference between the time held by the timer 102 and the previously notified time. By the processing in step S20, as shown in FIG. 2, the time-synchronization between the timer 101 and the timer 102 is implemented in each of the control devices 100A-100C (corresponding to time-synchronization (2) in FIG. 2). In each control device 100, the timer 201 possessed by the field equipment 200 is further synchronized with the timer 102 of the field network controller 140 (corresponding to time-synchronization (3) in FIG. 2). As a result, each field equipment 200 connected to each of the plurality of control devices 100 is time-synchronized with the timer 101 that is the grand master clock.

Next, the communication processing schedule of each of the plurality of control devices 100 is determined with reference to the time managed by the timer 101 which is the grand master clock. In the example of FIG. 6, first, the timing T1 to start the lower network communication processing is determined (step S30). In step S30, the timing T1 at the first system cycle Ts after completion of the time-synchronization processing described above is set as a timing at which a predetermined time α has elapsed from a timing T0 at which the time-synchronization processing is started (T1=T0+α). The predetermined time α is set to include the time required for the time-synchronization processing.

Besides, as shown in FIG. 6, the lower network communication processing is executed at every system cycle Ts. The timing T1 at the second and subsequent system cycles Ts is set as a timing obtained by adding a time corresponding to the system cycle Ts to the timing T1 at the previous system cycle Ts (T1 (current system cycle)=T1 (previous system cycle)+Ts).

Next, for each of the plurality of control devices 100, the time required for the lower network communication processing (hereinafter also referred to as "lower network communication processing time t1") is calculated (step S40). Since the lower network communication processing time t1 depends on a communication status between the control device 100 and the field equipment 200, as shown in FIG. 6, the length may be different for each control device 100. The communication status between the control device 100 and the field equipment 200 includes a data size exchanged between the control device 100 and the field equipment 200, a communication band for transmitting data, a time required for transmitting the data sent on the field network 110 to the field equipment 200, a time required for each field equipment 200 to receive data and be capable of outputting a signal corresponding to the received data from the field equipment 200, and the like. At least a part of these elements can be set by the user using the setting tools mounted on the support device 400. For each of the plurality of control devices 100, the lower network communication processing time t1 is calculated based on the elements set by the user.

Next, among the lower network communication processing time t1 calculated for each control device 100 in step S40, the largest value is calculated as a "maximum lower network communication processing time t1_low" (step S50).

Next, the control timing of the field equipment 200 connected to the field network 110 in each of the plurality of control devices 100 is determined. When a plurality of field equipment 200 is connected to the field network 110, the control timings of the plurality of field equipment 200 are determined based on the timing of receiving data by the field equipment 200 which receives data at the latest timing among the plurality of equipment 200.

Next, in each of the plurality of control devices 100, a timing T2 to start the upper network communication processing is determined (step S70). The timing T2 to start the upper network communication processing is determined based on the maximum lower network communication processing time t1_low with reference to the timing T1 to start the lower network communication processing determined in step S30. In the example of FIG. 6, the timing T2 is set to a timing obtained by adding the maximum lower network communication processing time t1_low to the timing T1 (T2=T1+t1_low).

As described above, by matching the timings T1 to start the lower network communication among the plurality of control devices 100, the timings of the input/output refresh processing for the field equipment 200 can be synchronized with each other among the plurality of control devices 100. Furthermore, by matching the timings T2 to start the upper network communication among the plurality of control devices 100, the timings of the input/output refresh processing can be synchronized with each other among the plurality of control devices 100 that executes independent control.

Thereby, the control timings of the field equipment 200 can be synchronized among the plurality of control devices 100. As a result, the cooperative control of the plurality of field equipment 200 connected to the control devices 100 different from each other can be performed.

<H. Application Example>

Figure 9:
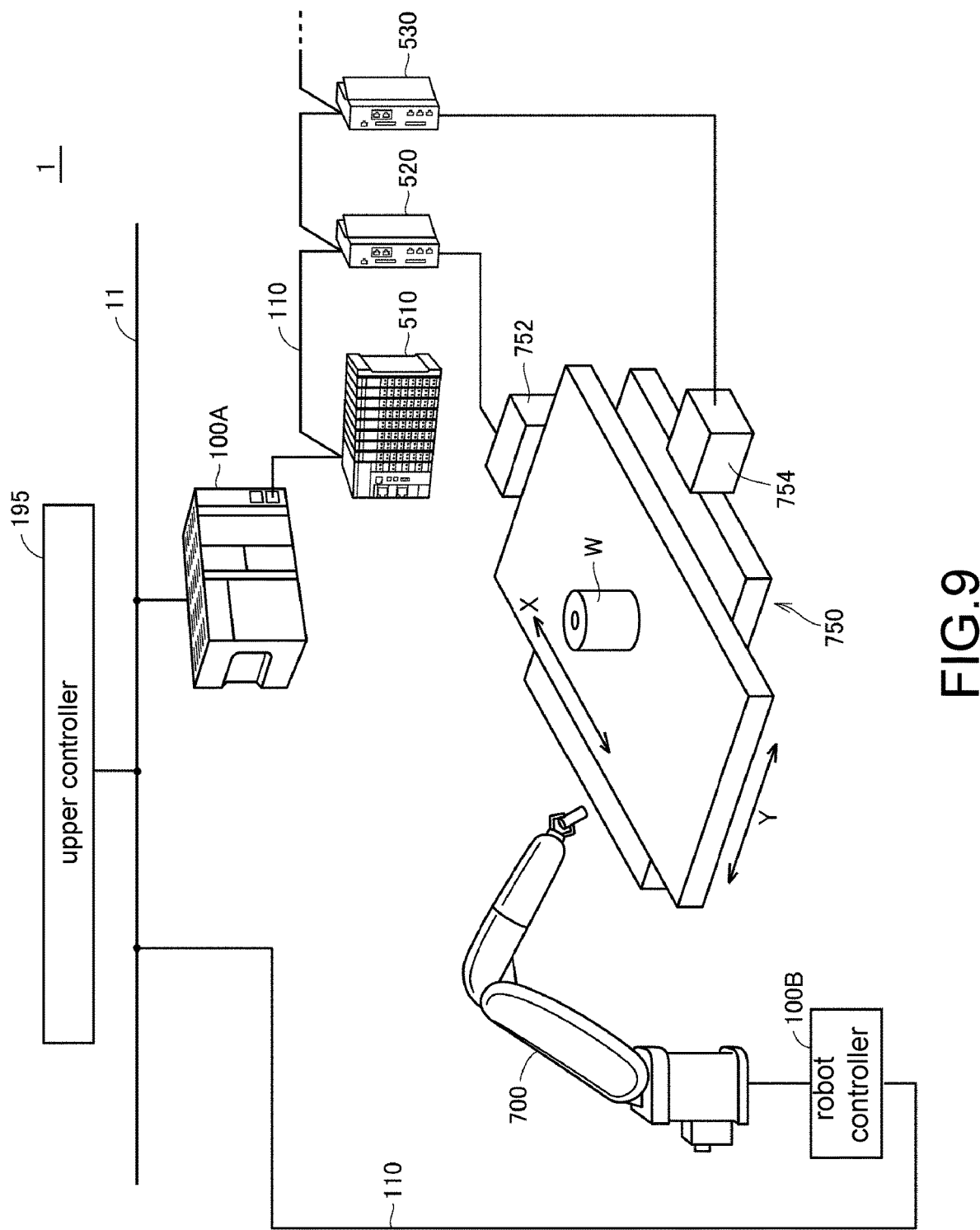
FIG. 9 is a schematic diagram showing an application example of the control system of the embodiment.

FIG. 9 is a schematic diagram showing an application example of the control system 1 of the embodiment. FIG. 9 shows an example in which the control system 1 of the embodiment is applied to a robot assembly system.

Referring to FIG. 9, the robot assembly system includes an articulated robot 700 and an XY stage 750 that holds a work-piece W. FIG. 9 shows an application example in which a component gripped by the front end of the articulated robot 700 is inserted into a hole arranged in the work-piece W.

The control device 100A is connected to various field equipment 200 via the field network 110. The control device 100A may be typically embodied as a PLC. The field equipment 200 includes a remote I/O (Input/Output) device 510 and servo drivers 520 and 530.

The remote I/O device 510 typically includes a communication coupler that performs communication via the field network 110, and an input/output unit for acquiring input data and outputting output data. A device that collects input relays or input data of various sensors or the like, and a device that has some effect on fields such as output relays, contactors, support drivers, and other optional actuators are connected to the remote I/O device 510.

The servo driver 520 drives a servo motor 752 that drives an X-axis of the XY stage 750 according to the output data (for example, a position command, a speed command, or the like) from the control device 100A (PLC). The servo driver 530 drives a servo motor 754 that drives a Y-axis of the XY stage 750 according to the output data from the control device 100A.

The control device 100B is connected to the field equipment 200 via the field network 110. The field equipment 200 includes the articulated robot 700. The control device 100B may be typically embodied as a robot controller.

That is, in the robot assembly system, the articulated robot 700 is driven by the control device 100B (robot controller), and the XY stage 750 is driven by the control device 100A (PLC). Since the articulated robot 700 and the XY stage 750 need to be cooperated, both the control device 100A and the control device 100B are connected to an upper controller 195 via the upper network 11. The upper controller 195 gives a command to the control device 100A and the control device 100B.

The control device 100A uses the input data acquired via the remote I/O device 510 and the internal data to compute the output data according to the sequence control, and outputs the computed output data from the remote I/O device 510. The control device 100A positions the work-piece W disposed on the XY stage 750 at an appropriate position by giving a command value computed in the motion control to each servo driver 520.

On the other hand, the control for the articulated robot 700 is implemented by the control device 100B (robot controller) disposed separately from the control device 100A (PLC). By sequentially executing instructions described in the robot program, the control device 100B causes the articulated robot 700 to perform a predetermined behavior.

Since the control device 100A and the control device 100B execute the independent control processing, information of each device is exchanged on the upper network 11 so that the XY stage 750 and the articulated robot 700 are made to operate in a coordinated manner.

In the robot assembly system of the embodiment, the control device 100A has timers synchronized with the remote I/O device 510 and the servo driver 520, and the control device 100B has timers synchronized with the articulated robot 700. Then, the control device 100A and the control device 100B are time-synchronized by causing a timer in any one of the control device 100A and the control device 100B to function as a master (grand master clock) of the entire control system 1.

By performing the scheduling of the communication processing based on this synchronized time, the timing to start processing for transmitting/receiving data between the control device 100A and the remote I/O device 510 and servo driver 520, and the timing to start processing for transmitting/receiving data between the control device 100B and the articulated robot 700 are made to match with each other. Furthermore, the timings to start the processing for transmitting/receiving data between the control device 100A and the control device 100B are matched.

By employing this configuration, the timings at which data is output or the timings at which data is updated can be synchronized with each other between the remote I/O device 510 and servo driver 520 and the articulated robot 700. As a result, for example, when the work-piece W before processing is disposed in a predetermined position or when the assembled work-piece W is taken out, the control timings can be synchronized between the articulated robot 700 and the XY stage 750. Thereby, processing waiting is not required between the articulated robot 700 and the XY stage 750, and thus the processing time can be shortened. In addition, when the XY stage 750 is operated and the articulated robot 700 is operated because the operation of the articulated robot 700 and the operation of the XY stage 750 are synchronized, the operation timings can be matched, and thus the processing precision can be improved.

<I. Advantage>

According to the control system 1 of the embodiment, each of the plurality of control devices connected to the same upper network has a timer (first timer) time-synchronized with other control devices, the timing for transmitting/receiving data to/from one or more field equipment via the lower network can be determined with reference to the time of this timer. Thereby, the timings for collecting input data or the time for transmitting output data can be synchronized with each other among the plurality of control devices. In addition, since the plurality of control devices are time-synchronized with each other, the timings for exchanging data of respective equipment can be synchronized with each other. As a result, it is possible to perform the cooperative control of the plurality of equipment connected to the control devices different from each other.

Thereby, since the control timings can be synchronized among the plurality of equipment connected to the control devices different from each other, the processing waiting is not required among the plurality of equipment, and the processing time can be shortened. In addition, since the operations of the plurality of equipment are synchronized with each other, the operation timings can be matched, and the processing precision can be improved as a result.

[Appendix]

As described above, the embodiment includes the following disclosures.

(1) In the embodiment, a control system (1) is provided which includes a plurality of control devices (100) connected to a first network (11), and one or more equipment (200) connected to each of the plurality of control devices (100) via a second network (110) lower than the first network (11). Each of the plurality of control devices (100) includes an upper communication part which transmits/receives first data to/from other control devices (100) via the first network (11), and a lower communication part which transmits/receives second data to/from the one or more equipment (200) via the second network (110). The upper communication part has a first timer (101) time-synchronized with each other among the plurality of control devices (100). The lower communication part determines, based on the time of the first timer (101), a timing (timing T1 in FIG. 6) to start processing for transmitting the second data to the one or more equipment (200).

(2) In the control system (1), preferably, the upper communication part determines a timing (timing T2 in FIG. 6) to start processing for transmitting the first data, based on a maximum value of the time (time t1 in FIG. 6) required for transmission/reception of the second data by the lower communication part in each of the plurality of control devices (100) with reference to the timing (timing T1 in FIG. 6) to start processing for transmitting the second data.

(3) In the control system (1), preferably, each of the plurality of control devices (100) executes a user program after executing the processing for transmitting the second data and the processing for transmitting the first data at a predetermined cycle.

(4) In the control system (1), preferably, the lower communication part includes has a second timer (102) time-synchronized with the one or more equipment (200). Each of the plurality of control devices (100) further includes a synchronization part for time-synchronization between the first timer (101) and the second timer (102).

(5) In the control system (1), preferably, the upper communication part transmits/receives the first data according to a first protocol. The lower communication part transmits/receives the second data according to a second protocol different from the first protocol. The synchronization part corrects the time of the second timer (102) with reference to the first timer (101).

(6) In the control system (1), preferably, the lower communication part updates the second data at every predetermined cycle. The upper communication part divides the first data into data sizes corresponding to the time available at every cycle, and then assigns each divided data to a plurality of cycles.

(7) In the embodiment, control devices (100) connected to a first network (11) and connected to one or more equipment (200) via a second network (110) lower than the first network (11) are provided. The control device (100) includes an upper communication part which transmits/receives first data to/from other control devices (100) via the first network (11), and a lower communication part which transmits/receives second data to/from the one or more equipment (200) via the second network (110). The upper communication part has a first timer (101) time-synchronized with the other control devices (100). The lower communication part determines, based on the time of the first timer (101), a timing to start processing for transmitting the second data to the one or more equipment (200).

The embodiments disclosed herein should be considered as illustrative but not restrictive in all respects. The scope of the present invention is shown by the scope of the claims instead of the above description, and is intended to include meaning equivalent to the scope of the claims and all changes within the scope.

What is claimed is:

1. A control system, comprising:
    a plurality of control devices connected to a first network, and
    each of the plurality of control devices is connected to one or more equipment via a second network lower than the first network;
    wherein each of the plurality of control devices comprises:
        an upper communication part which transmits/receives first data to/from other control devices via the first network, and
        a lower communication part which transmits/receives second data to/from the one or more equipment via the second network;
    the upper communication part has a first timer time-synchronized with each other among the plurality of control devices, and
    the lower communication part determines, based on the time of the first timer, a timing to start processing for transmitting the second data to the one or more equipment,
    wherein the upper communication part determines a timing to start processing for transmitting the first data, based on a maximum value of the time required for transmission/reception of the second data by the lower communication part in each of the plurality of control devices with reference to the timing to start processing for transmitting the second data.

2. The control system according to claim 1, wherein each of the plurality of control devices executes a user program after executing the processing for transmitting the second data and the processing for transmitting the first data at a predetermined cycle.

3. The control system according to claim 1, wherein the lower communication part has a second timer time-synchronized with the one or more equipment, and
    each of the plurality of control devices further includes a synchronization part for time-synchronization between the first timer and the second timer.

4. The control system according to claim 3, wherein the upper communication part transmits/receives the first data according to a first protocol,
    the lower communication part transmits/receives the second data according to a second protocol different from the first protocol, and
    the synchronization part corrects the time of the second timer with reference to the first timer.

5. The control system according to claim 1, wherein the lower communication part updates the second data at every predetermined cycle; and
    the upper communication part divides the first data into data sizes corresponding to time available at every cycle, and then assigns each divided data to a plurality of cycles.

6. The control system according to claim 2, wherein the lower communication part has a second timer time-synchronized with the one or more equipment, and
    each of the plurality of control devices further includes a synchronization part for time-synchronization between the first timer and the second timer.

7. A control device connected to a first network and connected to one or more equipment via a second network lower than the first network, comprising:
    an upper communication part which transmits/receives first data to/from other control devices via the first network, and a lower communication part which transmits/receives second data to/from the one or more equipment via the second network;

wherein the upper communication part has a first timer time-synchronized with the other control devices, and the lower communication part determines, based on the time of the first timer, a timing to start processing for transmitting the second data to the one or more equipment, wherein the upper communication part determines a timing to start processing for transmitting the first data, based on a maximum value of the time required for transmission/reception of the second data by the lower communication part in each of the plurality of control devices with reference to the timing to start processing for transmitting the second data.

8. A control system, comprising:

a plurality of control devices connected to a first network, and each of the plurality of control devices is connected to one or more equipment via a second network lower than the first network;

wherein each of the plurality of control devices comprises:

an upper communication part which transmits/receives first data to/from other control devices via the first network, and a lower communication part which transmits/receives second data to/from the one or more equipment via the second network;

the upper communication part has a first timer time-synchronized with each other among the plurality of control devices, and the lower communication part determines, based on the time of the first timer, a timing to start processing for transmitting the second data to the one or more equipment, wherein the lower communication part has a second timer time-synchronized with the one or more equipment, and each of the plurality of control devices further includes a synchronization part for time-synchronization between the first timer and the second timer.

9. The control system according to claim 8, wherein the upper communication part transmits/receives the first data according to a first protocol, the lower communication part transmits/receives the second data according to a second protocol different from the first protocol, and the synchronization part corrects the time of the second timer with reference to the first timer.

10. A control system, comprising:

a plurality of control devices connected to a first network, and each of the plurality of control devices is connected to one or more equipment via a second network lower than the first network;

wherein each of the plurality of control devices comprises:

an upper communication part which transmits/receives first data to/from other control devices via the first network, and a lower communication part which transmits/receives second data to/from the one or more equipment via the second network;

the upper communication part has a first timer time-synchronized with each other among the plurality of control devices, and the lower communication part determines, based on the time of the first timer, a timing to start processing for transmitting the second data to the one or more equipment, wherein the lower communication part updates the second data at every predetermined cycle; and the upper communication part divides the first data into data sizes corresponding to time available at every cycle, and then assigns each divided data to a plurality of cycles.

11. A control device connected to a first network and connected to one or more equipment via a second network lower than the first network, comprising:

an upper communication part which transmits/receives first data to/from other control devices via the first network, and a lower communication part which transmits/receives second data to/from the one or more equipment via the second network;

wherein the upper communication part has a first timer time-synchronized with the other control devices, and the lower communication part determines, based on the time of the first timer, a timing to start processing for transmitting the second data to the one or more equipment, wherein the lower communication part has a second timer time-synchronized with the one or more equipment, and each of the plurality of control devices further includes a synchronization part for time-synchronization between the first timer and the second timer.

12. The control device according to claim 11, wherein the upper communication part transmits/receives the first data according to a first protocol, the lower communication part transmits/receives the second data according to a second protocol different from the first protocol, and the synchronization part corrects the time of the second timer with reference to the first timer.

13. A control device connected to a first network and connected to one or more equipment via a second network lower than the first network, comprising:

an upper communication part which transmits/receives first data to/from other control devices via the first network, and a lower communication part which transmits/receives second data to/from the one or more equipment via the second network;

wherein the upper communication part has a first timer time-synchronized with the other control devices, and the lower communication part determines, based on the time of the first timer, a timing to start processing for transmitting the second data to the one or more equipment, wherein the lower communication part updates the second data at every predetermined cycle; and the upper communication part divides the first data into data sizes corresponding to time available at every cycle, and then assigns each divided data to a plurality of cycles.

* * * * *